Patented Sept. 30, 1941

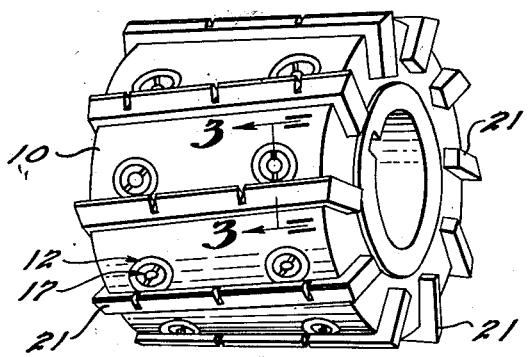
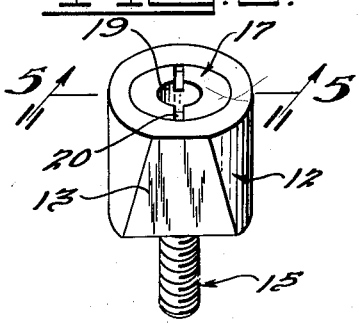
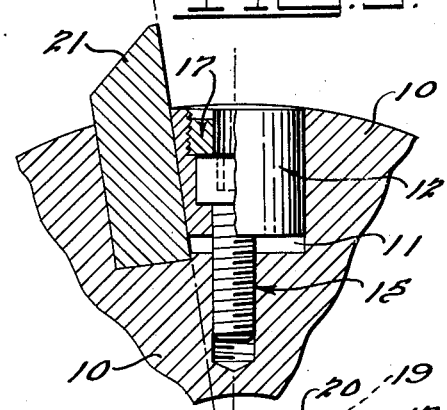
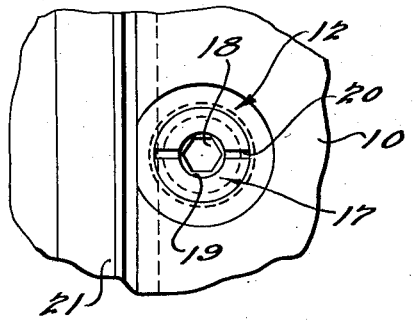
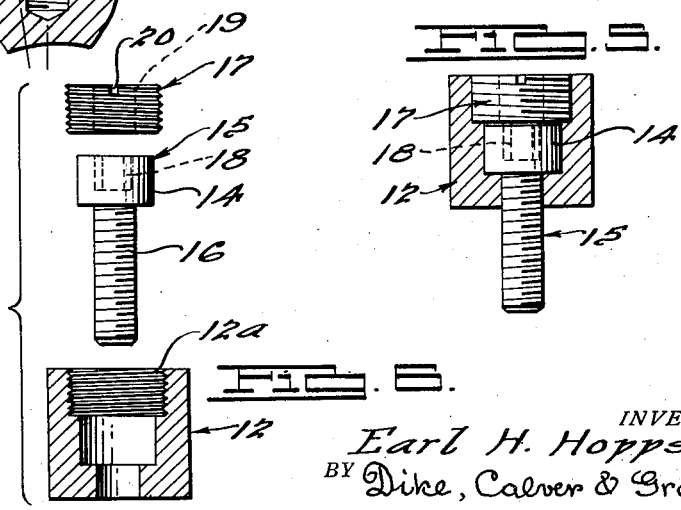

2,257,169

UNITED STATES PATENT OFFICE 2,257,169

ROTARY CUTTER

Earl H. Hopps, Ferndale, Mich.

Application October 6, 1939, Serial No. 298,175

12 Claims. (Cl. 29—105)

This invention relates to holding devices and more particularly to such devices as may be used in connection with articles of manufacture having removable parts, such for instance as tools and cutters with insertable teeth or blades.

One of the difficulties which has been encountered in the art relating to devices for holding removable parts, such as milling cutter or reamer blades, results from the fact that such devices are so formed that their removal or releasing for adjustment or removal of the blade is very difficult. In cases of milling cutters, for instance, blade holding devices lodge themselves so tightly in the cutter body that their removal requires exertion of considerable force. If the device is fitted flush with the cutter body, its removal becomes particularly difficult, since the device does not provide a portion to which a force may be conveniently applied and it is usually glued in its nest by the dirt and grease hardened to a considerable extent if the cutter were operated hot. In such cases punches, hooks, or chisels are usually used for removing the holding device, which in many cases results in damage to the cutter blade, its body, or the holding device itself. When removal of the holding device is attempted by knocking on the blade with a sledge hammer, breakage of the blade may easily occur. In addition, inconvenience of handling greasy cutters or tools often causes severe cuts on operators' hands in the process of such difficult removal.

One of the objects of the present invention is to provide an improved holding device for articles of manufacture having insertable parts, which device while holding the parts securely in place, can be removed or released easily and quickly to permit adjustment or removal of the insertable parts.

Another object of the invention is to provide an improved holding device of the character specified, means being provided to actuate the entire device positively in two directions, namely, in the direction in which the device is moved to tighten the insertable part in its nest, as well as in the direction to release said part.

Still another object of the invention is to provide an improved holding device for insertable blades of milling cutters, reamers and the like, which device operates positively in two directions, and which does not have to be completely removed for adjusting or removing the blade.

A further object of the invention is to provide an improved holding device for tools with insertable blades, in which device there are provided means preventing undesirable displacement of its parts when the device is operated in reverse direction for the purpose of releasing the blade.

A still further object of the invention is to provide an improved holding device which can hold an insertable part, such as a blade or a tooth in a tool body in a recess or nest readily provided, such for instance as in a hole drilled in the tool body.

A still further object of the invention is to provide an improved tool with insertable blades which tool is easy to assemble and adjust, and which is safe and convenient in operation, and is easy to disassemble and repair.

A still further object of the invention is to provide an improved holding device all parts of which can be made from bar stock on automatic screw machines or similar machine tools in large quantities.

It is an added object of the present invention to provide an improved device of the foregoing character, which is simple in construction, dependable in operation and is relatively inexpensive to manufacture.

Other objects and advantages of this invention will appear in the following description and appended claims, reference being had to the accompanying drawing forming a part of this specification wherein like reference characters designate corresponding parts in the several views.

Fig. 1 is a perspective view illustrating a milling cutter embodying the present invention.

Fig. 2 is a perspective view illustrating one form of holding device embodying the present invention, the device being shown removed from the cutter body.

Fig. 3 is a fragmentary sectional view taken in the direction of the arrows on the section plane passing through the line 3—3 of Fig. 1.

Fig. 4 is a fragmentary top view taken radially of the cutter on one of the blades thereof.

Fig. 5 is a sectional view taken in the direction of the arrows on the section plane passing through the line 5—5 of Fig. 2.

Fig. 6 is an exploded view, partly in section, of the holding device shown in section in Fig. 5.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is shown, by way of example, a milling cutter having a plurality of insertable blades held in place with the aid of a holding device embodying the present invention. Although a milling cutter has been described and illustrated in the present application in connection with one form of my improved holding device, it will be understood that the improved holding device of my invention can be successfully used with any tool or other device having insertable teeth, blades and the like.

Referring to the drawing, and particularly to Fig. 1, the numeral 10 designates the main body of a milling cutter provided with a plurality of countersunk radial holes 11. Into the wider portion of said countersunk holes are fitted wedge members 12. Each of said members comprises a cylindrical body having one side slanted as indicated at 13, said slanting being done at an angle to the longitudinal axis of the wedge member. Each of the wedge members 12 is provided with a multiple, in the present instance three, step countersunk holes extending axially of the member. The middle portion of said countersunk hole is adapted to receive the head 14 of a screw generally indicated by the numeral 15, the threaded shank 16 of said screw protruding through the narrow portion of said stepped hole. The wide portion of the countersunk hole provided in the member 12 is internally threaded as indicated at 12a and is adapted to receive an externally threaded plug 17 arranged substantially flush with the top of the wedge member. The head 14 of the screw is provided with a suitable recess for engaging the screw for rotation with a tool such as a wrench or a screw driver. In the present embodiment an axially extending hexagonal recess 18 is provided in the head of said screw 15. A hole 19 is provided in the plug 17 to permit easy access to said recess 18 with a suitable plug wrench. The plug 17 is preferably provided at its top with a screw driver slot 20. Adjacent the holes 11 and partly coinciding with the wider portion thereof there is provided a corresponding plurality of slots adapted to receive insertable blades 21. Said slots are provided in the cutter body at such an angle that said blades 21 when in place are flatly engaged by the slanted sides 13 of said wedge members 12.

When a blade 21 is inserted in its corresponding slot and the holding device is introduced into the hole 11, the screw 15 is rotated to engage with its shank the narrow threaded portion of the hole 11. The screw 15 is rotated with the aid of a suitable wrench inserted through the hole 19 and engaging the head 14 of said screw at the hole 18 thereof, as explained. When the screw 15 is rotated in the clockwise direction, it is drawn radially toward the axis of the body 10. Since the screw 15 engages the wedge member 12 with its head, it draws said member inwardly of the body 10 until the slanted side 13 of said wedge member engages firmly the blade 21 holding the same in its slot by a wedging action. Thus, the blades 21 may be inserted and secured in their respective slots in a very simple and convenient manner. In the assembled condition the tops of the wedge members 12 extend substantially flush with the body 10, leaving no recesses in which grease, chips, and dirt may collect. The wedge members 12 also do not leave any protruding parts and therefore the body 10 with the exception of the blades 21 presents a substantially smooth appearance.

Serious difficulties have been experienced with prior known holding devices of the general type, since no means of ready removal or releasing the same was provided. Such devices could be removed only with difficulty and frequently only after chiseling or knocking them out of the body with hammers and the like. Such removal of the holding devices inevitably damaged the holding device and the body of the tool. Also such methods for freeing the holding device rendered adjustment of the blades very difficult. With many conventional structures, including screw actuated wedges, the screw has to be completely removed from the tool body for releasing the blade for slight adjustments. My improved holding device may be removed or adjusted in the same manner as it is set in place, namely, by rotation, since it is arranged so that the screw operates both to tighten and to loosen the wedge member in the tool body. When the screw 15 is rotated counterclockwise, its head 14 presses on the plug 17 and pushes the wedge member 14 outwardly of the body 10, thus releasing the blade 21. No chiseling or hammering is necessary. Only a few turns of the wrench release the blade 21 for adjustments, and complete removal of the screw 15 is not necessary.

The screw threads on the screw 15 and the plug 17 preferably run in opposite directions. In the present embodiment, the screw 15 is provided with a right-hand thread, and the plug 17 with the left-hand thread. By virtue of such a construction no loosening of the plug 17 takes place when the screw 15 is rotated in the counterclockwise direction.

Holding devices constructed in accordance with my invention may be successfully used in many tools having insertable teeth or blades such as various cutters, reamers and the like. If the blade is of a considerable length, several holding devices of my invention may be employed along its entire length, or the wedge member of the holding device may be made of an elongated shape. I prefer to use cylindrical wedge members, since the same may be easily made from round bar stock in screw machines in large quantities. In fact, all parts of the holding device illustrated herein may be so produced. In addition, the cylindrical holes 11 may be made with an ordinary drill in a tool body held in an indexing head, which operation is very rapid.

It will be observed therefore, that movement of the wedge portion of the body either to lock or release an adjacent removable member is initiated and controlled at all times in both directions and in a positive manner by movement of the set screw 15.

The simplified construction of my improved holding device and its susceptibility to quantity production, makes it suitable to become a standard article, its various sizes being designated by the sizes of the drills for the holes of the wedge member and the holding screw.

I claim:

1. In a holding device, a wedge element adapted to engage the member to be held and to hold the same by pressing it in a predetermined direction, an element adapted to move said wedge element to produce pressure in said predetermined direction and capable of moving in a reverse direction, and means separate from said element, said means being secured to said wedge member and operatively connecting said wedge member and said element to effect reverse movement of said wedge member.

2. In a blade holding device, a wedge member adapted to hold the blade by pressing the same by its wedge surface, a threaded element adapted to move said member to press said blade, said element being capable of moving in reverse direction, and means separate from said element, said means being secured to said wedge member for connecting said member and said element for simultaneous movement in the reverse direction.

3. In a device for holding a removable blade, a cup-shaped member having a bottom with a hole therethrough and a slanted side adapted to press on the blade when said member is moved axially in a predetermined direction, a screw having a head engaging the bottom of said member and a shank protruding through the hole thereof to produce a pressing force on said member, and means arranged at the open end of said member and adapted to provide an abutment for the head of said screw when the same is moved in the reverse direction.

4. In a device for holding a removable blade, a cup-shaped member having a hole in its bottom and a slanted side adapted to press on the blade when said member is moved axially in a predetermined direction, a screw having a shank passing through the hole in the bottom of said cup-shaped member and a head engaging the bottom of said member and adapted to move the same to produce a pressing force on said member, and plug means arranged at the open end of said member and adapted partially to close the same, thereby providing an abutment for the head of said screw when the same is rotated in the reverse direction.

5. In a device for holding a removable blade, a cup-shaped member having a hole in its bottom and a slanted side adapted to press on the blade when said member is moved axially in a predetermined direction, a screw having a shank passing through the hole in the bottom of said cup-shaped member and a head engaging the bottom of said member and adapted to move the same to produce a pressing force on said member, and a threaded annular plug adapted to be screwed into the open end of said member to close the same, the annulus thereof being arranged to permit movement of said screw head by a wrench extending through said plug.

6. In a device for holding a removable blade, a cup-shaped member having a hole in its bottom and a slanted side adapted to press on the blade when said member is moved axially in a predetermined direction, a screw having a shank passing through the hole in the bottom of said cup-shaped member and a head engaging the bottom of said member and adapted to move the same to produce a pressing force on said member, and a threaded annular plug adapted to be screwed into the open end of said member to close the same, the annulus of said plug being arranged to permit insertion of a tool therethrough for manipulating said screw head, the threads of said screw and said plug running in opposite directions.

7. In a tool having a removable blade and provided with a slot for receiving said blade and a recess adjacent to said slot, a hollow wedge member adapted to enter said recess and to engage said blade to hold the same in said slot, a screw having a head entering the hollow provided in said wedge member and adapted when rotated to force said member into said recess, and a plug adapted to be screwed into the hollow end to provide an abutment for said screw head to prevent retraction of said screw independently of said wedge member.

8. In a tool having a removable blade and provided with a slot receiving said blade and a cylindrical recess adjacent said slot, a cup-shaped member having a hole in its bottom and a slanted side and adapted to fit into said recess engaging said blade with said slanted side to hold the same in said slot, a screw having a head entering the cup-shaped member and engaging the bottom thereof, said screw protruding through the bottom thereof with its shank, said shank engaging the body of said tool to move said member into said recess when rotated, and a threaded plug closing the open end of said member to provide an abutment for the head of said screw when the same is rotated to move said member out of said recess.

9. In a tool having a main body provided with a slot, a blade insertable into said slot, a cylindrical hole provided in said body adjacent said slot and partly coinciding therewith, a cup-shaped member having a bottom with a hole therethrough and adapted to enter said cylindrical hole and provided with an inclined wedge surface adapted to engage said blade and to hold the same in said recess by a wedging action; a screw having a head entering the cup-shaped member engageable with the bottom thereof and protruding through the hole in said bottom to provide a screw threaded shank adapted to engage a screw threaded opening in said body and when rotated in one direction to draw said cup-shaped member into said hole, and into wedging enagement with said blade, a plug positively secured to said member and adapted to provide an abutment for the head of said screw when the same is rotated in an opposite direction to release said wedging engagement of said member and said blade.

10. In a tool having a cylindrical body provided with a radial cylindrical recess and a slot extending at an angle to the axis of said hole and communicating therewith, a hollow cylindrical member provided with a countersunk axially extending internal recess, a screw arranged coaxially within said recess and adapted to engage the same with its head and extend through said recess to provide an extending screw threaded shank adapted to engage with screw threaded openings provided in the body of said tool to draw said member into said hole and to wedge a blade in said slot, and a plug in said member adapted to provide a shoulder engageable by the head of said screw when the same is rotated in an opposite direction to release the wedging action on said blade.

11. A tool comprising a body provided with a plurality of tooth-receiving recesses, a corresponding plurality of teeth fitted into said recesses respectively, a plurality of holding devices one for each of said teeth, each of said devices including a cylindrical member fitted substantially flush in said body and having a slanted side with which it engages the corresponding blade, a screw having a shank engaging an internally threaded hole in said body and a head engaging said member and moving the same inwardly of said body when the screw is rotated; a screw having a shank engaging an internally threaded hole in said body, and a head entering a recess in said member to engage said member for moving the same inwardly of said body when the screw is rotated to tighten the blade in place; and a plug in said member partly enclosing said screw head in said recess and thus providing a positive connection between said screw and said member to move the latter outwardly of said body when the screw is rotated to release said blade.

12. A tool comprising a body provided with a plurality of tooth-receiving recesses, a corresponding plurality of teeth fitted into said recesses respectively, a plurality of holding devices one for each of said teeth, each of said devices including a cylindrical member fitted substantially flush in said body and having a slanted side with which it engages the corresponding blade, a screw having a shank engaging an internally threaded hole in said body and a head engaging said member and moving the same inwardly of said body when the screw is rotated; a screw having a shank engaging an internally threaded hole in said body, and a head entering a recess in said member to engage said member for moving the same inwardly of said body when the screw is rotated to tighten the blade in place; and a threaded plug in said member partly enclosing said screw head in said recess and thus providing a positive connection between said screw and said member to move the latter outwardly of said body when the screw is rotated to release said blade, the threads of said screw and said plug being of opposite directions.

EARL H. HOPPS.